United States Patent Office 3,547,915
Patented Dec. 15, 1970

3,547,915
SUBSTITUTED BENZO-1,4-OXAZINES
Oskar Bub, Ludwigshafen (Rhine), Germany, assignor to Knoll A.G. Chemische Fabriken, Ludwigshafen (Rhine), Germany, a corporation of Germany
No Drawing. Filed Aug. 9, 1967, Ser. No. 659,302
Claims priority, application Germany, Aug. 11, 1966, K 60,001; Mar. 8, 1967, K 61,643
Int. Cl. C07d 87/48
U.S. Cl. 260—244
12 Claims

ABSTRACT OF THE DISCLOSURE

N-substituted 3,4-dihydro-(2H)-1,4-benzoxazines useful as analgesics which possess relative freedom from undesirable side effects, such as depression of the respiratory system and dilation of the pupils of the eyes. Several representative examples of the compounds are 4-(piperidino-acetyl)-3,4-dihydro-(2H) - 1,4 - benzoxazine and 4-(di-methylamino-acetyl)-3,4-dihydro - (2H) - 1,4 - benzoxazine.

---

This invention deals with N-haloacylated 3,4-dihydro-(2H)-1,4-benzoxazines, methods for their manufacture, and pharmaceutical compositions as well as methods of applications thereof for producing analgesia. The compounds possess advantageous properties; they are useful drugs, in particular analgesics having beneficial freedom of undesirable side effects. The invention also deals with other novel precursors and derivatives of said N-haloacylated benzo-1,4-oxazines.

This invention is concerned with a new N-substituted benzo-1,4 oxazine of the Formula I

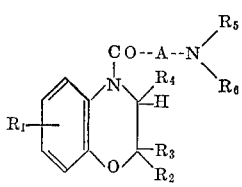

(I)

wherein $R_1$ is selected from one of the following: hydrogen, chlorine, methyl or methoxy, $R_2$, $R_3$ and $R_4$ are each selected from one of the following: hydrogen, alkyl of 1 to 3 carbon atoms, phenyl or benzyl, $R_5$ and $R_6$ are each, when considered individually, selected from one of the following: hydrogen, alkyl- of 1 to 6 carbon atoms or cycloalkyl-radical of 3 to 6 carbon atoms, alkyl substituted phenyl, said alkyl being a lower alkyl group, in which the phenyl might be substituted by one or a plurality of methoxy groups, and $R_5$ and $R_6$ are, considered together with the adjacent nitrogen atom, a heterocyclic ring selected from the following: piperidino, pyrrolidyl, morpholino and N'-methylpyrazinyl, and A is alkylene of 1 to 3 carbon atoms, or their non-toxic, pharmaceutically acceptable acid addition salts.

The compounds have a combination of useful and unexpected pharmacological properties without undesirable side effects. The N-aminoalkyl-(2H)-1,4-benzoxazines-3-(4H)-one (phenmorpholone-3) disclosed by Kurihara et al., in Tohoku Yakka Daigaku Kiyo, 9, 77–81 (1962), C.A. 59, 2808h (1963) are distinctly different from the compounds of the invention.

The new compounds of the invention may be prepared by the following methods which have been found particularly advantageous. Reaction of an N-haloacylated 3,4-dihydro-(2H)-1,4-benzoxazine of the Formula II.

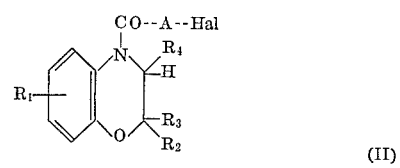

(II)

wherein Hal represents, for instance, chlorine or bromine with an amine of the Formula III

(III)

wherein $R_5$ and $R_6$ have the definition stated above. The reaction is carried out preferably in the presence of an agent which neutralizes the generated hydrogen halide. The reaction is advantageously carried out by reacting equimolar quantities of the individual reaction components. Suitable agents for neutralizing the hydrogen halide are, for example, triethylamine or a dialkyl-aniline and the like. Instead of a separate agent capable of neutralizing the hydrogen halide, two to three mols of the amine, i.e. one of two mols excess, may also be employed. The reaction is carried out in the presence or absence of a solvent, such as an alcohol, especially ethanol, or hydrocarbons, especially benzene or toluene, etc. at temperatures between about room temperature and the boiling point of the solvent used, such as or between 20 and 200° C., preferably between 80 and 150° C.

The production of the above described haloacylated compounds II may be accomplished by reacting the corresponding 3,4-dihydro-(2H)-1,4-benzoxazine, with a haloacylated halogenide like Hal—A—CO—Hal, wherein A has been defined above.

The non-toxic, pharmacologically acceptable, addition salts of the compounds of the invention are readily obtainable by classical methods to give the hydrochloric, sulfuric, phosphoric, acetic, maleic, sulfonic, tartaric, ascorbic acid salts, respectively, and the like.

The compounds of the invention are useful drugs. They have a useful and unobvious combination of pharmaceutical properties, particularly they possess excellent analgesic activity free of undesirable side effects. In particular, they exhibit fredom of depression of the respiratory systems in mammals. They also are free of dilating effect on the pupils of the eye. In this respect, the compounds of the invention offer unexpected advantages over morphine and its known narcotic derivatives which are known to have undesirable depressive inhibition on the respiratory center systems. The compounds of the invention are therefore a highly useful group of drugs.

The following examples are further illustrative of the invention and are not to be construed as a limitation thereof.

EXAMPLE I

4 - (dimethylamino-acetyl)-3,4-dihydro - (2H) - 1,4-benzoxazine is prepared as follows.

In a solution of 10 grams of dimethylamine in 100 ml. of benzene, there are added portionwise 21.2 grams of 4-(chloroacetyl)-3,4-dihydro-(2H)-1,4-benzoxazine while cooling and stirring. The reaction mixture is allowed to stand 24 hours at room temperature, the benzene solution is sucked off from the separated dimethylamine hydrochloride; and the liquid phase is extracted several times with dilute hydrochloric acid. From the collected acid portions, the base is precipitated by the addition of dilute sodium hydroxide and is taken up in ether. After drying over potassium carbonate, the solvent is distilled off and the product which is obtained by recrystallization from cyclohexane amounts to 20.5 grams (93% of theory) and melts at 63–64° C.

The 4-chloroacetyl-3,4-dihydro-(2H)-1,4-benzoxazine used above (having a melting point of 108–109° C. upon recrystallization from ethanol), is obtained by the reaction of 3,4-dihydro-(2H) - 1,4-benzoxazine with chloroacetyl chloride.

EXAMPLE 2

In a similar manner as in Example 1, there is obtained 4-(methylamino-acetyl)-3,4-dihydro - (2H) - 1,4-benzoxazine from the reaction of 4-chloroacetyl-3,4-dihydro-(2H)-1,4-benzoxazine with methylamine. The product has a boiling point of 139–141° C./0.4 mm. Hg; the hydrochloride has a melting point of 208–209° C., upon recrystallization from ethanol.

EXAMPLE 3

The 4-(piperidino-acetyl)-3,4-dihydro - (2H) - 1,4-benzoxazine is prepared as follows.

There are heated 21.2 grams of 4-chloroacetyl-3,4-dihydro-(2H)-1,4-benzoxazine under reflux for 2 hours with a solution of 19 grams of piperidine in 100 ml. of benzene. After cooling, the benzene solution is sucked off from the precipitated piperidine hydrochloride, and then extracted several times with hydrochloric acid. From the acid extracts, the base is precipitated by addition of dilute sodium hydroxide and then taken up in ether. After drying over potassium carbonate, the solvent is distilled off. There is obtained 23 grams of the base (89% of theory); the product has a boiling point of 138–140° C./0.01 mm. Hg; melting point 68–70° C.; the hydrochloride has a melting point of 216° C., upon recrystallization from ethanol.

EXAMPLES 4–16

In Table I, below, there are given the starting 4-haloacylated-3,4-dihydro-(2H)-1,4-benzoxazines, of the general Formula II, given above, which are reacted with the respective amines III to give the new compounds, listed below in Table II, having the general Formula I.

TABLE I.—EXAMPLES 4–16
[Typical 4-haloacylated-3,4-dihydro-(2H)-1,4-benzoxazine]

| Examples | $R_1$ | $R_2$ | $R_3$ | $R_4$ | A | Hal. | M.P. or B.P., °C. |
|---|---|---|---|---|---|---|---|
| 4 | H | H | H | H | $(CH_2)_2$ | Cl | [1] 108–110 |
| 5 | H | H | H | H | $(CH_2)_3$ | Cl | 50–51 |
| 6 | H | H | H | H | $CH(CH_3)$ | Br | [2] 130–131 |
| 7 | 6-$CH_3$ | H | H | H | $CH_2$ | Cl | 101–102 |
| 8 | 6-Cl | H | H | H | $CH_2$ | Cl | 92–93 |
| 9 | 7-$OCH_3$ | H | H | H | $CH_2$ | Cl | 81–82 |
| 10 | H | $CH_3$ | H | H | $CH_2$ | Cl | 105–106 |
| 11 | H | $CH_3$ | $CH_3$ | H | $CH_2$ | Cl | 91–92 |
| 12 | H | i-$C_3H_7$ | H | H | $CH_2$ | Cl | 56–57 |
| 13 | H |  | H | H | $CH_2$ | Cl | [1] 148–150 |
| 14 | H | $CH_2$- | H | H | $CH_2$ | Cl | 100–101 |
| 15 | H | H | H | $CH_3$ | $CH_2$ | Cl | 89–90 |
| 16 | H | H | H |  | $CH_2$ | Cl | 133–134 |

[1] At 0.1 mm. Hg.
[2] At 0.2 mm. Hg.

Following the procedure of the examples above, there are prepared the compounds of the invention, as illustrated in Table II.

3,547,915

TABLE II.—EXAMPLES 17–39
[Typical N-amino-acyl-3,4-dihydro-(2H)-1,4-benzoxazines]

| Examples | R₁ | R₂ | R₃ | R₄ | R₅ | R₆ | A | B.P. base (° C.) | M.P. HCl or oxalate (° C.) |
|---|---|---|---|---|---|---|---|---|---|
| 17 | H | H | H | H | —C₂H₅— | —C₂H₅ | —CH₂— | ¹ 136-138 | ² 130-132 |
| 18 | H | H | H | H | H | ⌬ (phenyl) | Same | | 224-225 |
| 19 | H | H | H | H | H | —(CH₂)₂—C₆H₄—OCH₃ | do | | 233-234 |
| 20 | H | H | H | H | —CH₃ | —(CH₂)₂—C₆H₄—OCH₃ | do | | 221-222 |
| 21 | H | H | H | H | morpholino (O, N-ring) | | do | 94-95 | |
| 22 | H | H | H | H | N-methylpiperazino | | do | | ³ 230-231 |
| 23 | H | H | H | H | piperidino | —CH₃ | —(CH₂)₂— | 110-111 | 160-161 |
| 24 | H | H | H | H | piperidino | | Same | | 179-180 |
| 25 | H | H | H | H | piperidino | —CH₃ | —(CH₂)₃— | | ² 122-123 |
| 26 | H | H | H | H | pyrrolidino | | Same | | ² 165-166 |
| 27 | H | H | H | H | piperidino | | —CH(CH₃)— | 77-78 | |
| 28 | H | H | H | H | Same as above | | Same | 86-87 | 229-230 |
| 29 | 6—CH₃ | H | H | H | do | | —CH₂ | 57-58 | 185-186 |
| 30 | 6—Cl | H | H | H | do | | Same | | 238-239 |
| 31 | 7—OCH₃ | H | H | H | do | | do | | 217-218 |
| 32 | Same | H | H | H | —CH₃ | | —CH₂— | | 227-228 |
| 33 | H | —CH₃ | H | H | Same as above | | Same | 90-91 | |
| 34 | H | Same | —CH₃ | H | do | | do | 61-62 | 224-225 |
| 35 | H | 1—C₃H₇ | H | H | do | | do | | |
| 36 | H | ⌬ (phenyl) | H | H | do | | do | 119-120 | |
| 37 | H | —CH₂—⌬ | H | —CH₃ | do | | do | 92-93 | |
| 38 | H | H | H | ⌬ | do | | do | 88-89 | 242 |
| 39 | H | H | H | H | do | —CH₃ | do | 63-64 | 140-141 |
| 40 | H | H | H | H | —CH₃ | —CH₃ | do | | ⁴ 120-121 |
| 41 | H | H | H | H | 1—C₃H₇ | H | do | | 224-225 |

¹ At 0.2 mm. Hg.    ² Oxalate.    ³ 2 HCl.    ⁴ Maleate.

EXAMPLE 42

The 4-(amino-acetyl)-3,4-dihydro-(2H)-1,4-benzoxazine is prepared by adding to a solution of 13.5 grams of 3,4-dihydro-(2H)-1,4-benzoxazine and 11 grams of triethylamine in 100 ml. of ether while stirring portionwise 23.5 grams of phthalimido-acetyl chloride. Subsequently, the mixture is heated under reflux for one hour. The liquid fraction is sucked off from the precipitate which is stirred with water, the liquid fraction is sucked off again and washed with water. After recrystallization from dimethyl formamide, there are obtained 24 grams of 4-(phthalimido-acetyl)-3,4-dihydro-(2H)-1,4-benzoxazine having a melting point of 222–223° C.

23.5 grams of the 4-(phthalimido-acetyl)-3,4-dihydro-(2H)-1,4-benzoxazine are reduced to a fine powder, suspended in 250 ml. of ethanol and then heated, while stirring under reflux, to boiling. During one hour there are added dropwise 4.8 grams of an 80% hydrazine solution in 50 ml. of ethanol, subsequently, the mixture is again heated for 4 hours to boiling. The cooled solution is separated by suction from the precipitated phthalyl hydrazide, concentrated to about 50 ml. and there is obtained by filtration of the resulting precipitate, upon the addition of alcoholic hydrochloric acid, the 4-(amino-acetyl)-3,4-dihydro-(2H)-1,4-benzoxazine hydrochloride. Upon recrystallization from ethanol, there are obtained 13 grams of hydrochloride having a melting point of 256–258° C.

The N-amino-acyl-3,4-dihydro-(2H)-1,4-benzoxazines, prepared in the above examples, are excellent analgesics which are free of the undesirable depressive inhibition on the respiratory system.

The following is an evaluation of typical compounds of the invention.

TABLE III

Compound evaluation

Designation: Compound
1 ------ 4 - (piperidino-acetyl)-3,4-dihydro-(2H)-1,4-benzoxazine.
2 ------ 4-(dimethylamino-acetyl) - 3,4 - dihydro-(2H)-1,4-benzoxazine.
3 ------ 2 - isopropyl-4-(piperidino-acetyl)-3,4-dihydro-(2H)-1,4-benzoxazine.
4 ------ 2 - phenyl-4-(piperidino-acetyl)-3,4-dihydro-(2H)-1,4-benzoxazine.
5 ------ 7 - methoxy-4-(N-dimethyl-acetyl)-3,4-dihydro-(2H)-1,4-benzoxazine.
6 ------ 6-chloro-4-(piperidino-acetyl) - 3,4 - dihydro-(2H)-1,4-benzoxazine.
7 ------ 6 - methyl-4-(piperidino-acetyl)-3,4-dihydro-(2H)-1,4-benzoxazine.
8 ------ Amidophenazone.
9 ------ Phenazone.
10 ----- Codeine.

subcutaneous and oral administration. The analgesic effect is determined by the hot plate method, Chen. J.Y.P., H. Beckmann, Science 113, 631 (1951), and the electroshock method, Luckner and Magun, Journ. Exp. Med. 117, 133 (1951). The antipyretic effect was determined after oral application of the compounds. Using a shunt thermometer the rectal temperature of a normothermical rat was continuously measured. The effect on the respiratory system was examined after intravenous application. Codeine and morphine show a respiratory inhibition effect which is antagonized by levallorphan the new compound of the invention do not effect the respiratory system.

It is evident that the new compounds are useful drugs especially valuable analgesics because unlike morphine, codeine and like narcotics, they do not paralyse the respiration centre and do not lead to addiction. In addition they do have antipyretic effects, comparable with known antipyretics like phenazone and amidophenazone.

The drugs may be administered is dosage form by means of diverse compositions, such as tablets, sugar-coated pills, capsules, ampoules, suppositories, drops or the like.

A typical tablet contains the following ingredients (based on the preparation of 10,000 tablets) and is prepared as follows.

|  | Grams |
|---|---|
| Compounds of the invention | 300 |
| Corn starch (about 12% water content) | 600 |
| Vinylpyrrolidone-vinylacetate | 30 |
| Copolymer (60:40 by weight). | |

The ingredients are mixed with ethanol or isopropanol to give an evenly granulated mass (1.2 mm. particle size). The material is dried to 870 grams and then screened to a particle size of 1.5 mm. and admixed with—

|  | Grams |
|---|---|
| Corn starch | 105 |
| Talcum | 20 |
| Calcium arachinate | 5 |

Tablets of 100 mg. each are pressed from 1 kg. lots. The tablet contains 30 mg. of active and 100 mg. of carrier substance, respectively.

Dragees are prepared in a similar manner from 30 mg. and 50 mg. of active and carrier substance and coated with sufficient sweetening material to a total weight of about 115 mg.

Ampoules (1 ml.) contain the following:

Compound of the invention—20 mg.
Sodium chloride—4.6 mg.
Sodium-citrate buffer pH 5.0—0.01 ml.
Aqua dest. ad—1 ml.
Sterilization—45 minutes at 101° C.

The amount of the effective material of the invention which would normally be administered is primarily de-

TABLE IV.—EVALUATION OF COMPOUNDS

| Compounds | Acute toxicity LD$_{50}$ (mg./kg.) | | Analgesic effect | | | | Effect on body temperature normothermical rat oral dose mg./kg. | |
|---|---|---|---|---|---|---|---|---|
| | | | Hot plate | | Electro-shock | | | |
| | Subcutaneous | Oral dose | Subcutaneous | Oral dose | Subcutaneous | Oral dose | 50 | 100 |
| 1 | 150 | 220 | 15 | | 5.5 | 30 | −0.5 | −1.5 |
| 2 | 450 | 560 | 60 | 95 | 45 | 60 | −0.8 | −1.7 |
| 3 | 330 | 500 | 55 | | 15 | 35 | −0.6 | −0.1 |
| 4 | 410 | 450 | | 45 | 80 | | −0.4 | −0.5 |
| 5 | 300 | 450 | 75 | 220 | 80 | 200 | | |
| 6 | 150 | 200 | 1.5 | | 25 | 55 | | |
| 7 | 105 | 215 | 12 | 35 | 13 | 35 | | |
| 8 | | 760 | 60 | 100 | 60 | 150 | −0.4 | −1.4 |
| 9 | | 890 | [1] 200 | | [1] 285 | | −0.6 | −0.6 |
| 10 | 170 | | 30 | 60 | 7 | | | |

[1] Only intraplanatar dose.

The compounds were further shown to be free of dilating effect on the pupil of the eye, in contrast to codeine.

Methods of testing.

The acute toxicity is determined by the method of Litchfield and Wilcoxon on white mice by intraveneous, termined by the physical characteristics of the recipient, and severity of the case. Obviously, the amount of the particular compound to be administered must be an "effective amount," i.e. an amount which is medically beneficial. It would be expected that the adult human dosage would normally be in the range of 10 to 100 mg., generally 20 to 30 mg. of the active compound.

As will be readily apparent to those skilled in the art, other examples of the herein-defined invention can be devised by various modifications, variations and adaptations without departing from the spirit and scope of the invention.

I claim:
1. A substituted benzo-1,4-oxazine of the formula

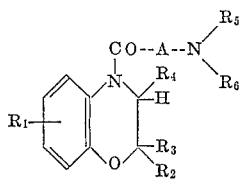

wherein
$R_1$ is selected from one of the following: hydrogen, chlorine, methyl or methoxy,
$R_2$, $R_3$ and $R_4$ are each selected from one of the following: hydrogen, alkyl of 1 to 3 carbon atoms, phenyl or benzyl,
$R_5$ and $R_6$ are each, when considered individually, selected from one of the following: hydrogen, alkyl of 1 to 6 carbon atoms or cycloalkyl of 3 to 6 carbon atoms,
$R_5$ and $R_6$ are, when considered together with the adjacent nitrogen atom, a heterocyclic ring selected from one of the following: piperidino, pyrrolidyl, morpholino and N'-methyl-pyrazinyl, and
A is alkylene of 1 to 3 carbon atoms or their non-toxic, pharmaceutically acceptable acid addition salts.

2. A benzo-1,4-oxazine of claim 1 in which $R_5$ and $R_6$ are, when considered together with the adjacent nitrogen atoms, a heterocyclic ring selected from one of the following: piperidino, pyrrolidyl, morpholino and N'-methylpyrazinyl or their non-toxic, pharmaceutically acceptable acid addition salts.

3. A benzo-1,4-oxazine of Claim 1 in which $R_5$ and $R_6$ are both alkyl or their non-toxic, pharmaceutically acceptable acid addition salts.

4. A benzo-1,4-oxazine of claim 1 in which $R_2$ and $R_3$ are selected from hydrogen, phenyl and alkyl or their non-toxic, pharmaceutically acceptable acid addition salts.

5. A non-toxic, pharmaceutically acceptable acid addition salt of a compound of claim 1.

6. 4-(piperidino-acetyl) - 3,4-dihydro-(2H)-1,4-benzoxazine.

7. 4-(dimethylamino-acetyl) - 3,4-dihydro-(2H)-1,4-benzoxazine.

8. 2-isopropyl-4-(piperidino - acetyl)-(2H)-3,4-dihydro-1,4-benzoxazine.

9. 2-phenyl-4-(piperidino-acetyl) - (2H)-3,4-dihydro-1,4-benzoxazine.

10. 7-methoxy-4-(N-dimethyl - acetyl)-3,4-dihydro-(2H)-1,4-benzoxazine.

11. 6-chloro-4-(piperidino-acetyl) - 3,4-dihydro-(2H)-1,4-benzoxazine.

12. 6-methyl-4-(piperidino - acetyl)-3,4-dihydro-(2H)-1,4-benzoxazine.

References Cited
UNITED STATES PATENTS
2,374,181  4/1945  Dickey et al. _____ 260—244
3,058,980  10/1962  Berg _____ 260—244

OTHER REFERENCES
Kurihara et al.: Chem. Abst., vol. 59, columns 2808–9 (1963).

NATALIE TROUSOF, Primary Examiner

U.S. Cl. X.R.
260—247.1, 247.2; 424—248